United States Patent
Lundqvist et al.

(10) Patent No.: US 10,836,666 B2
(45) Date of Patent: Nov. 17, 2020

(54) METHOD FOR OXIDATION OF A LIQUID PHASE IN A HYDROTHERMAL CARBONIZATION PROCESS

(71) Applicant: C-GREEN TECHNOLOGY AB, Stockholm (SE)

(72) Inventors: Fredrik Lundqvist, Ekerö (SE); Erik Odén, Stocksund (SE); Fredrik Öhman, Gävle (SE)

(73) Assignee: C-Green Technology AB, Stockholm (SE)

(*) Notice: Subject to any disclaimer, the term of this patent is extended or adjusted under 35 U.S.C. 154(b) by 0 days.

(21) Appl. No.: 16/306,280

(22) PCT Filed: Jun. 21, 2017

(86) PCT No.: PCT/SE2017/050681
§ 371 (c)(1),
(2) Date: Nov. 30, 2018

(87) PCT Pub. No.: WO2017/222462
PCT Pub. Date: Dec. 28, 2017

(65) Prior Publication Data
US 2019/0161373 A1 May 30, 2019

(30) Foreign Application Priority Data

Jun. 23, 2016 (SE) .................................. 1650902
May 8, 2017 (SE) .................................. 1750565

(51) Int. Cl.
*C02F 11/10* (2006.01)
*C10L 5/46* (2006.01)
(Continued)

(52) U.S. Cl.
CPC .............. *C02F 11/10* (2013.01); *C02F 11/08* (2013.01); *C10L 5/46* (2013.01); *C10L 9/086* (2013.01);
(Continued)

(58) Field of Classification Search
CPC ........... C02F 11/10; C02F 11/08; C02F 11/18; C02F 2103/34; C10L 5/46; C10L 9/086;
(Continued)

(56) References Cited

U.S. PATENT DOCUMENTS

| | | |
|---|---|---|
| 5,685,153 A | 11/1997 | Dickinson et al. |
| 2009/0301974 A1 | 12/2009 | Belkhodja et al. |

(Continued)

FOREIGN PATENT DOCUMENTS

| | | | |
|---|---|---|---|
| CH | 523205 | * | 5/1972 |
| DE | 102010062833 | | 6/2012 |

(Continued)

OTHER PUBLICATIONS

Reza et al. "Wet Air Oxidation of Hydrothermal Carbonization (HTC) Process Liquid", ACS Sustainable Chem. Eng. 4:3250-3254 (2016).

(Continued)

*Primary Examiner* — Cephia D Toomer
(74) *Attorney, Agent, or Firm* — Myers Bigel, P.A.

(57) ABSTRACT

There is provided a method of treatment of sludge, such as municipal or industrial sludge from a wastewater treatment plant, comprising the steps of: —preheating an incoming sludge with at least one steam fraction, preferably by direct steam injection, to obtain a preheated sludge; —further heating the preheated sludge with a high-temperature steam fraction, preferably by direct steam injection, to obtain a heated sludge; —hydrothermal carbonization (HTC) of the heated sludge to obtain a HTC-treated sludge; —separating
(Continued)

Figure 1:
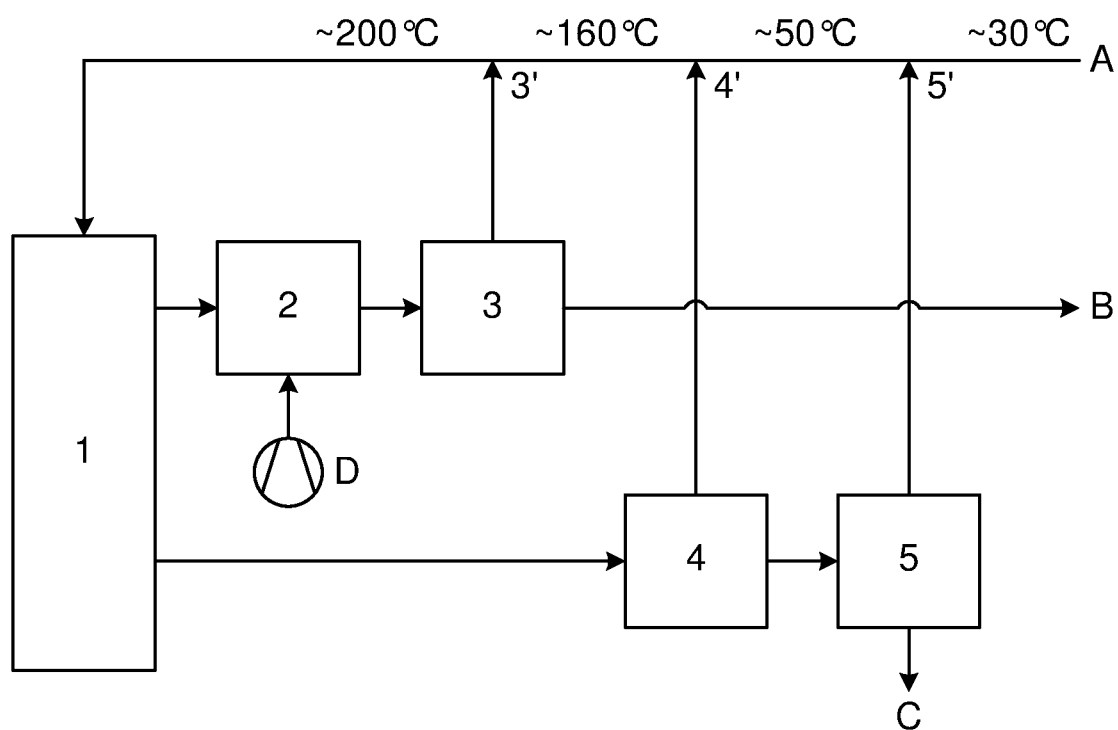

a particle-lean fraction from the HTC-treated sludge; —wet oxidation of the particle-lean fraction to obtain a heated particle-lean fraction; —subjecting the heated particle-lean fraction to a first flashing to obtain the high-temperature steam fraction used in the further heating step; —separating a particle-rich fraction from the HTC-treated sludge; —subjecting the particle-rich fraction to flashing to obtain at least one steam fraction that is used in the preheating step and a cooled particle-rich fraction.

16 Claims, 2 Drawing Sheets

(51) Int. Cl.
| | | |
|---|---|---|
| *C10L 9/08* | (2006.01) | |
| *C02F 11/08* | (2006.01) | |
| *C02F 11/18* | (2006.01) | |
| *C02F 103/34* | (2006.01) | |

(52) U.S. Cl.
CPC ........... *C02F 11/18* (2013.01); *C02F 2103/34* (2013.01); *C10L 2290/06* (2013.01); *C10L 2290/08* (2013.01); *C10L 2290/148* (2013.01); *C10L 2290/24* (2013.01); *C10L 2290/48* (2013.01); *C10L 2290/547* (2013.01); *Y02E 50/10* (2013.01); *Y02E 50/30* (2013.01)

(58) Field of Classification Search
CPC ........... C10L 2290/06; C10L 2290/148; C10L 2290/547; C10L 2290/08; C10L 2290/24; C10L 2290/48; Y02E 50/30; Y02E 50/10
See application file for complete search history.

(56) References Cited

U.S. PATENT DOCUMENTS

2012/0103040 A1  5/2012  Wolf et al.
2017/0197858 A1* 7/2017  Pardo ...................... C10L 9/086

FOREIGN PATENT DOCUMENTS

| EP | 2206888 | 7/2010 |
| EP | 2612842 | 7/2013 |
| WO | 2009/127727 | 10/2009 |

OTHER PUBLICATIONS

Riedel et al. "Combination of hydrothermal carbonization and wet oxidation of various biomasses", Chemical Engineering Journal 279:715-724 (2015).
International Search Report corresponding to International Application No. PCT/SE2017/050681 dated Sep. 19, 2017.
Written Opinion of the International Searching Authority corresponding to International Application No. PCT/SE2017/050681 dated Sep. 19, 2017.
Notification of Transmittal of International Preliminary Report on Patentability corresponding to International Application No. PCT/SE2017/050681 dated Dec. 15, 2017.
Extended European Search Report corresponding to European Application No. 17815818.4 dated Dec. 17, 2019.

* cited by examiner

METHOD FOR OXIDATION OF A LIQUID PHASE IN A HYDROTHERMAL CARBONIZATION PROCESS

STATEMENT OF PRIORITY

This application is a 35 U.S.C. § 371 national phase application of PCT Application No. PCT/SE2017/050681 filed Jun. 21, 2017, which claims priority to Swedish Application No. 1650902-8 filed Jun. 23, 2016 and Swedish Application No. 1750565-2 filed May 8, 2017, the entire contents of each of which is incorporated by reference herein.

TECHNICAL FIELD

The present disclosure relates generally to the treatment of sludge, and in particular to a method comprising processing of a particle-lean fraction downstream of a step of hydrothermal carbonization.

BACKGROUND

Sludge is typically what remains after wastewater treatment in municipal or industrial wastewater treatment plants. Municipal wastewater treatment plants treat wastewater from cities while industrial wastewater treatment plants treat water effluents from different industrial processes, for example pulp and paper mills, industrial food production facilities etc. Animal farming is also a considerable source of wastewater and sludge, for example large-scale pig farming. Embodiments of the present disclosure will be useful in all these areas.

The technologies for wastewater treatment are principally the same but include specific solutions depending on the character of the waste streams to be treated, basic design, local requirements and environmental concerns. In larger plants in Sweden, the wastewater treatment process often comprises mechanical pretreatment followed by primary (settling) and secondary (aerobic) treatment steps. In some cases different forms of tertiary treatment is also applied to remove remaining problematic substances, for example drug residues, toxic organic substances etc., in the treated water. In smaller plants one or more of these stages may often be omitted.

All wastewater treatment plants in use generate sludge that needs to be handled. The sludge is either recovered directly from the plant after dewatering (aerobic sludge) or first treated anaerobically for biogas production where part of the sludge is digested and the remainder is recovered as anaerobic sludge.

Wastewater treatment plants world wide produce about 150 million metric tons of sludge every year and the amount is rapidly growing. In Sweden, the total sludge volume in tons of dry solids per year (tDS/y) was reported to be 250 000 in 2010 and current figure is estimated to be the same or higher. Sludge handling is thus an enormous challenge for society, and present solutions are associated with high cost and frequently also a negative environmental impact.

Starting from 1986, the European Union has adopted several directives regulating the treatment and disposal of waste water sludge, addressing different aspects such as the use of sludge as landfill, the recovery of phosphorus, incineration of sludge etc. The various directives are reflected in national legislation in the individual member states, and for example in Sweden, the disposal of sludge in landfill has been prohibited since 2005.

Today, the main uses for wastewater sludge are fertilization in agriculture and forestry/silviculture, mixing into plant soil for ground construction projects and the coverage and restoration of landfills, incineration with energy recovery, recovery of chemicals and the production of fertilizers, and finally landfill, however provided that the sludge has undergone specific pretreatment, such as composting.

Incineration of the sludge, with energy recovery and suitable treatment of flue gases and ashes to recover harmful chemicals and heavy metals, remains an attractive alternative. The exact composition of the sludge however depends on the composition of the incoming wastewater and the type of wastewater treatment plant. Sludge with high concentrations of organic and/or biological components is generally difficult to dewater. The water content is frequently so high that the net heating value if incinerated in a power plant is very low or even negative and the addition of support fuels, often fossil fuel, may be necessary.

C-Green Technology AB has developed a process for treatment of sludge involving a step of hydrothermal carbonization (HTC). The process leads to complete hygienization and destruction/deactivation of organic toxins and pharmaceuticals, and produces a biofuel which is safe and practical to handle. Phosphorus can be extracted either from the biofuel before combustion or from ash after combustion.

Hydrothermal carbonization (HTC) is a thermochemical process used in the production of charred matter similar in composition to coal. It involves the use of a wet, organic feedstock, such as sludge, a relatively low temperature environment (180° C.-350° C.) and high autogenous pressure (up to 16.5 MPa) in a closed system.

EP 2 206 688 concerns the handling of process water remaining after hydrothermal carbonization of renewable raw materials and organic waste materials and the separation of the HTC product into a solids-rich stream and process water. The application discloses a method comprising subjecting such process water, in a separate reactor, to a thermo-chemical process such as oxidation in the presence of a catalyst. The pressure level of the thermo-chemical process through oxidation lies between the pressure level of the hydrothermal carbonization and atmospheric pressure. EP 2 206 688 shows how a single HTC product is withdrawn from the HTC reactor.

WO 2009/127727 relates to a hydrothermal carbonization process for the preparation of coal-like material using biomass. The process comprises a step (i) of heating a reaction mixture comprising water and biomass to obtain a reaction mixture comprising activated biomass; and a step (ii) of adding a polymerization initiator to the reaction mixture obtained in step (i) to polymerize the activated biomass and to obtain a reaction mixture comprising coal-like material. This is then separated into a solid phase and a liquid phase. The residual liquid phase may then be oxidized using any oxidizing agent, as long as this has a suitable oxidation potential to effect the oxidations as outlined hereinafter, and as long as the oxidizing agent or the reaction products thereof does not interfere with the further uses of the (oxidized) liquid phase as detailed below. Examples of useful oxidizing agents are, without limitation, oxygen, hydrogen peroxide, percarbonate, and percarbonic acids. Preferably, the oxidizing agent is an oxygen-containing gas, which is preferably air. In the case of the oxygen-containing gas, such as air, the oxidation of the liquid phase can be effected by bubbling the gas through the liquid phase, stirring the liquid phase in an atmosphere of the gas or by allowing the liquid phase to stand in the presence of the gas.

Although HTC-processes are already disclosed and also in use, there is a need for further improvement of the processes.

SUMMARY

The present inventors have found that the operation of hydrothermal carbonization (HTC) systems and plants for the treatment of sludge having an organic content can be significantly improved by adding a step of oxidation of a particle-lean fraction from the HTC reaction and using heat from the oxidation to bring the incoming sludge up the reaction temperature for the HTC, which means that no supply of external energy is necessary (except for starting the process). Such a process produce, in addition to HTC coal, a liquid stream with significantly improved biodegradability.

A first aspect thus relates to a method of treatment of sludge, such as municipal or industrial sludge (preferably from a wastewater treatment plant), comprising the steps of:
preheating an incoming sludge with at least one steam fraction, preferably by direct steam injection, to obtain a preheated sludge;
further heating the preheated sludge with a high-temperature steam fraction, preferably by direct steam injection, to obtain a heated sludge;
hydrothermal carbonization (HTC) of the heated sludge to obtain a HTC-treated sludge;
separating a particle-lean fraction from the HTC-treated sludge;
wet oxidation of the particle-lean fraction to obtain a heated particle-lean fraction;
subjecting the heated particle-lean fraction to a first flashing to obtain the high-temperature steam fraction used in the further heating step, typically to bring the slurry going into the reactor up to reaction temperature;
separating a particle-rich fraction from the HTC-treated sludge;
subjecting the particle-rich fraction to flashing to obtain at least one steam fraction that is used in the preheating step and a cooled particle-rich fraction.

Important features of the method of the first aspect is that the wet oxidation enables the generation of a steam fraction of particularly high temperature (higher than the temperature of the HTC reaction) and that this high-temperature steam fraction is the last steam fraction to heat the sludge that is routed to the reactor. The high-temperature steam fraction can thus bring the sludge up to the temperature of the HTC reaction.

As understood by the skilled person, the particle-lean fraction has lower total suspended solids (TSS) content than the particle-rich fraction.

The wet oxidation typically comprises injection of an oxidizing agent, normally chosen from oxygen, hydrogen peroxide, percarbonate, and percarbonic acids. The oxidizing agent is preferably an oxygen-containing gas, such as air, preferably compressed air or oxygen.

In a preferred embodiment, the method comprises subjecting the heated particle-lean fraction to further flashing to obtain at least one steam fraction that is used in the preheating step. It is understood that this further flashing is carried out subsequent to the first flashing.

In one embodiment, a steam fraction from the further flashing is merged with a steam fraction from the flashing of the particle-rich fraction having about the same pressure.

For a successful, yet energy-efficient, HTC, the heated sludge typically has a temperature of 180-250° C. Preferably, the temperature of the heated sludge is 195-230° C., more preferably 205-225° C.

The step of further heating (i.e. the step in which the high-temperature steam fraction is used) typically increases the temperature of the sludge by at least 10° C. It preferably increases the temperature of the sludge by at least 15° C., such as 15-60° C. More preferably it increases the temperature by at least 20° C., such as 20-50° C., most preferably 25-50° C.

Consequently, the temperature of the high-temperature steam fraction is typically 25-75° C. higher than the temperature of the preheated sludge. Preferably, it is 30-70° C. higher, such as 40-60° C. higher.

To obtain the above-mentioned increase in temperature, the temperature of the high-temperature steam fraction is typically 190-270° C. and preferably 205-270° C. The most preferred range for the temperature of the high-temperature steam fraction is 215-245° C.

As understood from the discussion above, the temperature of the high-temperature steam fraction is higher than the temperature of the heated sludge. The difference in temperature ($\Delta T$) is normally within the range of 9-40° C. If $\Delta T$ is too low, the pressure difference between the high-temperature steam fraction and the heated sludge is too low, which means that the steam supply must be controlled very precisely and that there is a risk that the driving force of the pressure difference is too low for successful injection of the steam. To obtain a $\Delta T$ above 40° C. is undesired as it requires that either a larger volume of particle-lean stream is extracted to produce enough steam or that the particle-lean stream is treated with wet oxidation at a very high temperature which leads to costly high-pressure design for the equipment. $\Delta T$ is preferably 10-35° C., such as 10-30° C. In a particularly preferred embodiment, $\Delta T$ is 10-25° C. According to the inventors' calculations, the optimal $\Delta T$ is 10-21° C.

The temperature of the particle-lean fraction before the wet oxidation step is normally about the same (e.g. ±5° C. or ±3° C.) as the temperature of the heated sludge.

The average retention time in the HTC step is normally 0.25-8 h and preferably 0.5-2 h. Consequently, the contents of the particle-lean fraction have on average undergone HTC for a period of 0.25-8 h before wet oxidation in the normal case and for a period of 0.5-2 h in a preferred embodiment.

In one embodiment, the method further comprises dewatering the cooled particle-rich fraction to obtain a solids fraction. Further, a particle-lean liquid stream may be obtained from said dewatering. This particle-lean liquid stream may be recirculated and blended into the incoming sludge stream. It is more preferred to recirculate this liquid stream than a liquid stream that has been subjected to wet oxidation because the wet oxidized stream is typically more easily decomposed in a wastewater treatment plant.

To provide enough "fuel" for the wet oxidation to increase the temperature of the particle-lean fraction to a sufficient degree, the COD (according to US EPA approved method 5220) of the particle-lean fraction is preferably at least 20 g/l. More preferably, the COD of the particle-lean fraction is at least 40 g/l, such as at least 50 g/l, before the wet oxidation. The COD of the particle-lean fraction is a function of the composition of the incoming sludge and the conditions, such as the temperature and/or the residence time, of the HTC reaction.

To avoid fouling of the equipment used for the wet oxidation and returning too much solid material to the wastewater treatment plant, the TSS of the particle-lean fraction is typically lower than 50 g/l, preferably lower than 30 g/l, more preferably lower than 20 g/l, and most preferably in an interval of 0-10 g/l.

A particle-lean liquid stream is obtained from the flashing(s) of the particle-lean fraction. As indicated above, this particle-lean liquid stream is wet oxidized and thus typically not recirculated in the method of the first aspect. Instead, it is preferably returned to a wastewater treatment plant in order to control the water balance of the HTC treatment process.

Accordingly, at least part (such as at least 90% by volume) of the particle-lean stream obtained from the flashing(s) of the particle-lean fraction is preferably not added to the incoming sludge. In one embodiment, at least part (such as at least 90% by volume) of this particle-lean liquid stream is returned to to wastewater treatment plant (preferably the wastewater treatment plant from which the sludge was obtained) where it may be subjected to further biological treatment.

As a second aspect, there is provided a system for treatment of sludge, such as municipal or industrial sludge (preferably from a wastewater treatment plant), comprising:

an inlet for receiving sludge;
a first reactor for subjecting said sludge to a hydrothermal carbonization (HTC) step;
an arrangement for routing sludge from the inlet to the first reactor, which arrangement comprises a preheating arrangement and a further heating arrangement, which is arranged downstream the preheating arrangement;
an arrangement for separating a particle-lean fraction and a particle-rich fraction from the HTC-treated sludge;
a second reactor for subjecting the particle-lean fraction to wet oxidation;
a first vapor-liquid separator arrangement for cooling the particle-rich fraction and providing at least one steam fraction;
a second vapor-liquid separator arrangement for cooling the oxidized fraction from said second reactor and providing a high-temperature steam fraction, which second vapor-liquid separator arrangement is provided downstream from said second reactor,
a first steam routing arrangement capable of routing said at least one steam fraction from said first vapor-liquid separator arrangement to the preheating arrangement; and
a second steam routing arrangement capable of routing said high-temperature steam fraction from said second vapor-liquid separator arrangement to the heating arrangement.

In an embodiment, the first reactor comprises a first outlet and a second outlet, which second outlet arranged below the first outlet. Thereby, the arrangement for separating the particle-lean fraction and the particle-rich fraction from the HTC-treated sludge is provided as the principles of fluidization and/or sedimentation may be utilized for the separation (see the reactor in SE 1550903 A1). In this embodiment, the second reactor is connected to the first outlet of the first reactor and the first vapor-liquid separator arrangement is connected to the second outlet of the first reactor.

The method of the first aspect may be carried out in the system of the second aspect.

In a preferred embodiment, the system further comprises a third vapor-liquid separator arrangement for further cooling the oxidized fraction from said second reactor and providing at least one steam fraction, which third vapor-liquid separator arrangement is provided downstream said second vapor-liquid separator arrangement. In such an embodiment, said first steam routing arrangement is further capable of routing said at least one steam fraction from the third vapor-liquid separator arrangement to the preheating arrangement. Thereby, the heat efficiency is increased.

For starting the process, the system may comprise an electrical heating arrangement. Such an electrical heating arrangement is preferably arranged on the arrangement for routing sludge from the inlet to the first reactor. The preferred position on the on the arrangement for routing sludge from the inlet to the first reactor is downstream the further heating arrangement.

In one embodiment, the system comprises a compressor for injecting pressurized air or oxygen into said second reactor. The skilled person understand that such a compressor may be connected to a pipe, which routes the pressurized air or oxygen to the second reactor.

Figure 2:
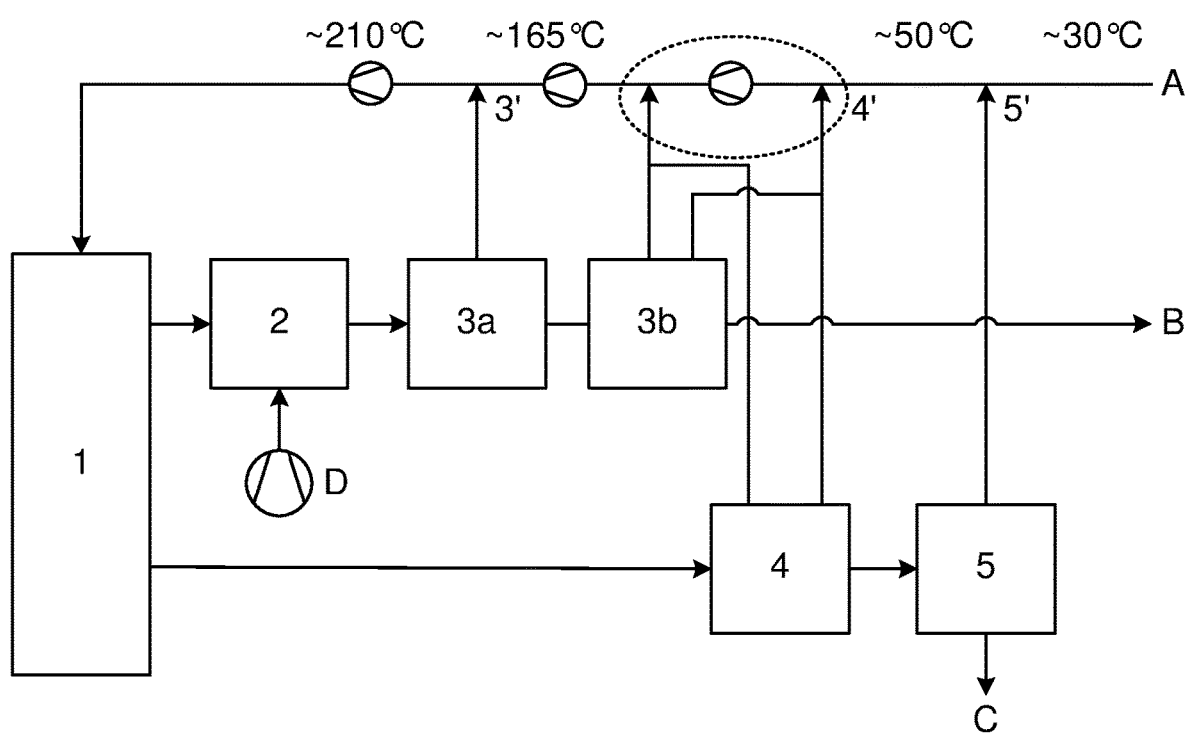

The sludge is preferably heated by direct steam injection. Accordingly, the preheating arrangement may comprise at least one steam mixer, e.g. at least one venturi mixer. In one embodiment, the preheating arrangement comprises at least two steam mixers for injection steam of different pressures. It is also preferred that the further heating arrangement comprises a steam mixer, such as a venturi mixer. Normally, a pump is arranged downstream each steam mixer, which is illustrated in FIG. 2.

The first vapor-liquid separator arrangement typically comprises at least one flash tank. Preferably, it comprises at least two flash tanks arranged in series to provide at least two steam fractions of different pressures. Such an arrangement provides for efficient heat recovery.

The second vapor-liquid separator arrangement typically comprises a flash tank. The third vapor-liquid separator arrangement typically comprises at least one flash tank. In one embodiment, the third vapor-liquid separator arrangement comprises at least two flash tanks.

The first steam routing arrangement may be arranged to merge a steam fraction from said first vapor-liquid separator arrangement with a steam fraction from the third vapor-liquid separator arrangement before the preheating arrangement. Thereby, less equipment needed in the preheating arrangement.

In one embodiment, the system further comprises a settling arrangement for obtaining a sediment fraction from the cooled HTC-treated sludge from the first vapor-liquid separator arrangement. The system may further comprise a sediment separation unit, such as a filter press, arranged downstream the settling arrangement for separating the sediment fraction into a solids fraction and a liquid fraction.

SHORT DESCRIPTION OF THE DRAWINGS

FIG. 1 schematically shows a process wherein incoming sludge is led to a HTC reactor, from which reactor at least one particle-lean fraction is led to a oxidation step, and at least one particle-rich fraction is led to vapor-liquid separation and subsequent dewatering.

FIG. 2 schematically shows a process wherein incoming sludge is heated and led to a HTC reactor, from which reactor at least one particle-lean fraction is led to a wet oxidation step followed by multiple flashings, and at least one particle-rich fraction is led to multiple flashings.

DESCRIPTION OF EMBODIMENTS

In traditional HTC-processes, heat exchange between the incoming sludge stream and outgoing HTC-product is not, with reasonable equipment size, efficient enough to allow reaching the necessary reaction temperature without addition of external heat in the form of e.g. steam, electricity or other energy carriers. Typically an input of between 400 to 1000 kWh/t dry solids is required to keep the HTC reaction going when municipal sludge is used as feedstock.

Further, the HTC process results in wastewater with is difficult to handle, as it still contains a significant part of the incoming organic content, typically 15-30%, with high COD levels and in many cases poor biodegradability. If this wastewater is returned to an aerobic or anaerobic cleaning step in the wastewater treatment plant, there is a risk of upsetting the microbiological balance, killing bacteria necessary for a well-functioning cleaning process, and in the end a risk for refractory (non-biodegradable) COD passing through the wastewater treatment plant and out into the water recipient.

The present inventors have realized that if a specific fraction from the HTC process is subjected to wet oxidation, the HTC process can be carried out without the addition of external heat or excessive use of equipment if heat is recovered in an intelligent way.

Accordingly, there is provided, as a first aspect of the present disclosure, a method of treatment of sludge, such as municipal or industrial sludge (preferably from a wastewater treatment plant), comprising the steps of:
  preheating an incoming sludge with at least one steam fraction, preferably by direct steam injection, to obtain a preheated sludge;
  further heating the preheated sludge with a high-temperature steam fraction, preferably by direct steam injection, to obtain a heated sludge;
  hydrothermal carbonization (HTC) of the heated sludge to obtain a HTC-treated sludge;
  separating a particle-lean fraction from the HTC-treated sludge;
  wet oxidation of the particle-lean fraction to obtain a heated particle-lean fraction;
  subjecting the heated particle-lean fraction to a first flashing to obtain the high-temperature steam fraction used in the further heating step;
  separating a particle-rich fraction from the HTC-treated sludge;
  subjecting the particle-rich fraction to flashing to obtain at least one steam fraction that is used in the preheating step and a cooled particle-rich fraction.

For example, it is possible to separate the HTC-treated sludge into the particle-lean fraction and a particle-rich (product) fraction in a HTC-reactor based on the principles of fluidization and/or sedimentation. This is further discussed in connection with the second aspect.

A fraction of the HTC-treated sludge, which preferably corresponds to the balance stream which needs to be discharged from the process to avoid liquid levels from building up, is treated by partial oxidation.

The wet oxidation step is preferably driven by oxygen (in the form of compressed air or $O_2$) in a reactor. The reactor for the wet oxidation step can be a conventional reactor as supplied by e.g. ZimPro or other similar companies.

The wet oxidation step may be controlled, inter alia by regulating the feed of oxidizing agent, so that the temperature is maintained significantly higher than the temperature of the HTC-step. This has the advantage that the oxidation process can be used to generate steam with high enough temperature for bringing the preheated sludge up to the reaction temperature of the HTC-step.

After wet oxidation, but before the subsequent first flashing, inert gases may be separated (in the oxidation reactor or separately). This is of particular importance when air is used as oxidizing reagent. After the first flashing, further flashing may be carried out to produce at least one steam fraction. Preferably, at least one steam fraction from such further flashing has substantially the same pressure as at least one steam fraction from the flashing of the particle-rich fraction. Steam fractions having substantially the same pressure may be combined before being used in the preheating, which reduces the equipment needed from the preheating.

The particle-lean fraction that has been subjected to the first flashing and optionally the further flashing may be subjected to a step of biological treatment or discharged into the sewage system. Preferably it is subjected to anaerobic treatment, utilizing the improved biodegradability for the production of biogas. The heat remaining in the particle-lean stream after the last flashing step can be utilized to keep the anaerobic reaction at a suitable reaction temperature.

As a second aspect of the present disclosure, there is provided a system for treatment of sludge, such as municipal or industrial sludge (preferably from a wastewater treatment plant), comprising:
  an inlet for receiving sludge;
  a first reactor for subjecting said sludge to a hydrothermal carbonization (HTC) step;
  an arrangement for routing sludge from the inlet to the first reactor, which arrangement comprises a preheating arrangement and a further heating arrangement, which is arranged downstream the preheating arrangement;
  an arrangement for separating a particle-lean fraction and a particle-rich fraction from the HTC-treated sludge;
  a second reactor for subjecting the particle-lean fraction to wet oxidation;
  a first vapor-liquid separator arrangement for cooling the particle-rich fraction and providing at least one steam fraction;
  a second vapor-liquid separator arrangement for cooling the oxidized fraction from said second reactor and providing a high-temperature steam fraction, which second vapor-liquid separator arrangement is provided downstream from said second reactor,
  a first steam routing arrangement capable of routing said at least one steam fraction from said first vapor-liquid separator arrangement to the preheating arrangement; and
  a second steam routing arrangement capable of routing said high-temperature steam fraction from said second vapor-liquid separator arrangement to the heating arrangement.

In the first reactor, which is preferably vertical, the principles of fluidization and/or sedimentation may be used to facilitate separation of the particle-lean fraction and the particle-rich fraction. Accordingly, the first reactor may comprise at least one upper outlet from which the particle-lean fraction is withdrawn and at least one lower outlet from which the particle-rich fraction is withdrawn. This means that the arrangement for separating the two fractions from the HTC-treated sludge is provided by the upper outlets(s) and the lower outlet(s). As a consequence, the second reactor is connected to the upper outlet(s) and the first vapor-liquid separator arrangement is connected to the lower outlet(s). Herein, it is also referred to the upper outlet(s) as the "first outlet" and the lower outlet(s) as the "second outlet".

In one embodiment, a settling arrangement, such as a settling tank, for separating the cooled sludge from the first vapor-liquid separator arrangement into a clear fraction and a sediment fraction is provided downstream the first vapor-liquid separator arrangement.

The system may further comprise a sediment separation unit, such as a filter press, arranged downstream the settling arrangement for separating the sediment fraction into a solids fraction and a liquid fraction. This liquid fraction may then be recirculated, for example as shown in FIG. 1, and fed into the incoming slurry.

According to another embodiment, freely combinable with the above, said system is arranged in a container adapted to be transported by a truck, preferably a shipping container, most preferably a 40 ft shipping container.

A method and system are schematically illustrated in FIG. 1, where sludge is received at (A) from a source, which can be for example but not limited to a municipal wastewater treatment plant, an industrial process, or an installation in agriculture or animal farming. The sludge has an initial temperature of about 30° C. but is heated stepwise (5', 4', 3') by steam and a particle-lean liquid stream from the process. The sludge is fed to a HTC reactor (1) where a HTC reaction is performed at a temperature of about 200° C. A particle rich slurry holding a temperature of about 200° C. is withdrawn from the HTC reactor, and subjected to liquid-vapor separation, or flashing, in a liquid-vapor separator (4) producing at least one steam fraction and a cooled particle rich slurry which is led further to dewatering (5) producing a particle-lean liquid stream holding a temperature of about 60-90° C., and a thick retentate, HTC coal (C). The 60-90° C. liquid stream is mixed with the incoming sludge at position 5', helping to heat the sludge to a temperature of about 50° C. The at least one steam fraction from the liquid-vapor separator (4) is used to heat the incoming slurry at position 4' from about 50° C. to about 160° C.

The particle-lean fraction holding a temperature of about 200° C. is led to an oxidation reactor (2) into which an oxidizing agent is fed, here illustrated by a compressor (D) pumping compressed air into the oxidation reactor. The oxidation reaction is exothermic, generating heat. The output from the oxidation has a temperature of about 270° C. and is led to a vapor-liquid separation arrangement (3) producing on the one hand a steam fraction holding a temperature of about 210° C., and a particle-lean liquid stream which can be returned to the wastewater treatment plant (B). The steam fraction holding a temperature of about 210° C. is then used to heat the incoming slurry from about 160° C. to about 200° C., which is sufficient for the HTC process. It is thus important that the oxidizing step is performed at a temperature higher than the HTC-temperature.

An important advantage of the process and system disclosed herein is the improved energy efficiency. The oxidation step generates a significant amount of heat which can be used to heat the sludge in the HTC step, significantly reducing (typically eliminating) the need for external heating after a starting phase.

External input of heat may however be required for startup of the HTC process. Once the target temperature has been reached, the whole heat requirement can be supplied internally by heat recovery from the wet-oxidized particle-lean liquid phase, providing the high-temperature steam necessary for final heating, and the particle-rich product phase.

A more refined method and system are schematically illustrated in FIG. 2, where sludge is received at (A) from a source, which can be a municipal wastewater treatment plant, an industrial process, or an installation in agriculture or animal farming. The sludge has an initial temperature of about 30° C. but is heated stepwise (5', 4', 3') by a particle-lean liquid stream from the process and steam fractions. The sludge is fed to a HTC reactor (1) where a HTC reaction is performed at a temperature of about 210° C. A particle rich slurry holding a temperature of about 210° C. is withdrawn from a lower outlet in the HTC reactor and subjected to liquid-vapor separation, or flashing, in first liquid-vapor separator (4) having two flashing vessels and thus producing two steam fractions of different pressures as well as a cooled particle rich slurry, which is led further to dewatering (5) producing a particle-lean liquid stream holding a temperature of about 60-90° C., and a thick retentate, HTC coal (C). The 60-90° C. liquid stream is mixed with the incoming sludge at position 5', helping to heat the sludge to a temperature of about 50° C.

A particle-lean fraction, which holds a temperature of about 210° C., is separated from an upper outlet in the HTC reactor and led to an oxidation reactor (2) into which an oxidizing agent is fed, here illustrated by a compressor (D) pumping compressed air into the oxidation reactor. The oxidation reaction is exothermic, generating heat. The output from the oxidation has a temperature of about 270° C. and is led to a second vapor-liquid separation arrangement (3a) producing a steam fraction holding a temperature of about 220° C. and a particle-lean liquid stream, which is led to a third vapor-liquid separation arrangement (3b), which has two flashing vessels and thus produces two steam fractions of different pressures and a liquid stream that can be returned to the wastewater treatment plant (B). The steam fraction holding a temperature of about 220° C. is used to further heat (3') the preheated slurry from about 165° C. to about 210° C., which is a preferred temperature for the HTC process. In the further heating (3') is carried out by direct injection of the steam in a venturi mixer. Downstream the venturi mixer, there is provided a pump.

The two steam fractions from the first liquid-vapor separator (4) as well as the two steam fractions from the third liquid-vapor separator (3b) are used to heat the incoming slurry in a preheating arrangement (4') comprising two venturi mixers arranged in series. Downstream each venturi mixer, there is provided a pump. The low pressure steam fractions from the first and third liquid-vapor separators (4, 3b) are combined and added in a first (upstream) venturi mixer of the preheating arrangement (4'). The high pressure steam fractions from the first and third liquid-vapor separator (4, 3b) are combined and added in a second (downstream) venturi mixer of the preheating arrangement (4').

The present disclosure further provides the following itemized listing of embodiments.

1. A method for treatment of sludge including a step of hydrothermal carbonization (HTC) of an incoming sludge/slurry producing HTC coal and at least one particle-lean liquid stream, characterized in that a first fraction of said slurry is withdrawn from said HTC step and subjected to a step of oxidation at an elevated temperature and pressure, said first fraction is, following said step of oxidation, subjected to flash steam recovery, producing steam and a first particle-lean liquid stream a second fraction of said slurry is withdrawn from said HTC step and subjected to flash steam recovery and subsequent dewatering, producing steam, a second particle-lean liquid stream, and HTC coal, and said steam is used to heat the incoming slurry.

2. The method according to item 1, wherein said first fraction has a total suspended solids (TSS) content which is lower than an average TSS of said incoming sludge stream.
3. The method according to item 2, wherein the TSS is lower than 50 g/l, preferably lower than 30 g/l, more preferably lower than 20 g/l, and most preferably in an interval of about 0 to about 10 g/l.
4. The method according to any one of item 1 to 3, wherein said first fraction is withdrawn at a temperature corresponding to the temperature in the HTC step.
5. The method according to any one of items 1 to 4, wherein said oxidation step is performed at a temperature in the interval of 180-300° C., preferably 230-300° C., by the injection of an oxidizing agent into said first fraction.
6. The method according to item 5, wherein said oxidizing agent is chosen from oxygen, hydrogen peroxide, percarbonate, and percarbonic acids, and preferably an oxygen containing gas, such as air, preferably compressed air.
7. The method according to item 5, wherein said oxidation step is conducted at a temperature significantly higher than the temperature of the HTC step.
8. The method according to any one of items 1 to 6, wherein said first particle-lean liquid stream is subjected to a step of biological treatment or discharged into a sewage system.
9. The method according to any one of items 1 to 7, wherein said second particle-lean liquid stream is recirculated and blended into the incoming sludge stream.
10. The method according to any one of items 1 to 8, wherein said HTC step is conducted at a temperature in the interval of 180-250° C. and for an average retention time in the interval of about 0.25 to about 8 hours, preferably 0.5-2 h.
11. A system for sludge treatment comprising
    an inlet for receiving sludge,
    an arrangement for heating said sludge,
    a first reactor for subjecting said sludge to a hydrothermal carbonization (HTC) step,
    an arrangement for diverting a fraction of the HTC-treated sludge, wherein the total suspended solids (TSS) content is lower in said fraction than in the incoming sludge stream,
    a second reactor for subjecting said fraction of HTC-treated sludge to oxidation at an elevated temperature,
    a first vapor-liquid separator arrangement for cooling the sludge from said first reactor and providing at least one first steam fraction, said arrangement provided downstream from said first reactor,
    a second vapor-liquid separator arrangement for cooling the oxidized sludge from said second reactor and providing at least one second steam fraction, said arrangement provided downstream from said second reactor,
    a steam routing arrangement capable of routing said at least one first steam fraction from said first vapor-liquid separator arrangement and said at least one second steam fraction from said second vapor-liquid separator arrangement to preheat sludge led from the sludge inlet to said first reactor, and
    a separation arrangement for separating cooled sludge from the vapor-liquid separator arrangements into a first fraction and a second fraction, wherein the suspended solids content is higher in the first fraction than in the second fraction.
12. The system according to item 11, wherein said heating arrangement includes an electrical heating arrangement.
13. The system according to any one of items 11 to 12, further comprising a compressor for injecting pressurized air into said second reactor.
14. The system according to any one of items 11 to 13, wherein said first and second flashing arrangement comprises a least one flash tank, each flash tank comprising a steam outlet connected to said steam routing arrangement.
15. The system according to any one of items 11 to 14, further comprising a sediment separation unit, such as a filter press, arranged downstream the settling arrangement for separating the sediment fraction into a solids fraction and a liquid fraction.

EXAMPLES

Example 1. Treatment of Municipal Sludge

In a laboratory experiment, samples of municipal anaerobically treated sludge are obtained, and the composition analyzed, noting at least the DS of the incoming sludge. The presence of possible toxic compounds may also be determined. This sludge is then charged in a batch reactor and hydrothermally treated at a temperature of 200° C. for 1 h. The resulting slurry is cooled and filtered to produce a liquid particle-lean stream. This liquid particle-lean stream is reheated to 200° C. in the batch reactor and partially oxidized by introducing oxygen gas into the batch reactor.

The temperature increase is recorded, and the exothermic reaction heat (MJ/kg dry substance) determined. The resulting liquid is cooled and analyzed. The ratio of BOD and COD of the liquid stream is often used as a rough measure of biodegradability. In this experiment, COD and BOD values are measured before and after oxidative treatment and the ratio between BOD and COD is shown to increase, which indicates positive effects on the biodegradability. In the case that the presence and/or concentration of possibly toxic compounds is determined already in the incoming sludge, or in the filtrate following the HTC step, it is of interest to also analyze the same compounds in the particle-lean liquid stream. Suitable methods are for example gas chromatography or mass spectroscopy. A reduction in the number of unwanted substances and/or a reduction in the concentration of such substances is taken as an indication of the efficacy of the oxidation.

Without further elaboration, it is believed that a person skilled in the art can, using the present description, including the examples, utilize the present invention to its fullest extent. Also, although the invention has been described herein with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

The invention claimed is:

1. A method of treatment of sludge, comprising the steps of:
    preheating an incoming sludge with at least one steam fraction, to obtain a preheated sludge;
    further heating the preheated sludge with a high-temperature steam fraction, to obtain a heated sludge;
    subjecting the heated sludge to hydrothermal carbonization (HTC) to obtain a HTC-treated sludge;
    separating a particle-lean fraction from the HTC-treated sludge;
    subjecting the particle-lean fraction to wet oxidation to obtain a heated particle-lean fraction;

subjecting the heated particle-lean fraction to a first flashing to obtain the high-temperature steam fraction used in the further heating step;
separating a particle-rich fraction from the HTC-treated sludge;
subjecting the particle-rich fraction to flashing to obtain at least one steam fraction that is used in the preheating step and a cooled particle-rich fraction,
wherein the temperature of the high-temperature steam fraction is 9-40° C. higher than the temperature of the heated sludge and the temperature of the particle-lean fraction before the wet oxidation step is about the same as the temperature of the heated sludge.

2. The method of claim 1, further comprising subjecting the heated particle-lean fraction to further flashing to obtain at least one steam fraction that is used in the preheating step.

3. The method of claim 1, wherein the step of further heating increases the temperature of the sludge by at least 10° C.

4. The method of claim 1, wherein the heated sludge has a temperature of 180-250° C.

5. The method of claim 1, wherein the temperature of the high-temperature steam fraction is 190-270° C.

6. The method of claim 1, wherein the temperature of the high-temperature steam fraction is 10-35° C. higher than the temperature of the heated sludge.

7. The method of claim 1, wherein the temperature of the high-temperature steam fraction is 25-75° C. higher than the temperature of the preheated sludge.

8. The method of claim 1, wherein the average retention time in the HTC step is 0.25-8 h.

9. The method of claim 1, further comprising dewatering the cooled particle-rich fraction to obtain a solids fraction.

10. The method of claim 9, wherein a particle-lean liquid stream is obtained from said dewatering, recirculated and blended into the incoming sludge stream.

11. The method of claim 1, wherein the total suspended solids (TSS) of the particle-lean fraction is lower than 50 g/l.

12. The method of claim 1, wherein the chemical oxygen demand (COD) according to US EPA approved method 5220 of the particle-lean fraction is at least 20 g/l before the wet oxidation.

13. The method of claim 1, wherein a particle-lean liquid stream is obtained from the flashing(s) of the particle-lean fraction, which particle-lean liquid stream is returned to a wastewater treatment plant.

14. The method according to claim 13, wherein at least part of the particle-lean liquid stream is not added to the incoming sludge.

15. The method of claim 1, wherein the sludge is municipal or industrial sludge from a wastewater treatment plant.

16. The method of claim 1, wherein said preheating an incoming sludge with at least one steam fraction is carried out by direct steam injection and said further heating the preheated sludge with a high-temperature steam fraction is carried out by direct steam injection.

* * * * *

UNITED STATES PATENT AND TRADEMARK OFFICE
CERTIFICATE OF CORRECTION

PATENT NO. : 10,836,666 B2  
APPLICATION NO. : 16/306280  
DATED : November 17, 2020  
INVENTOR(S) : Lundqvist et al.

Page 1 of 1

It is certified that error appears in the above-identified patent and that said Letters Patent is hereby corrected as shown below:

On the Title Page

Item (30) Foreign Application Priority Data: Please correct "1650902" to read -- 1650902-8 --

Item (30) Foreign Application Priority Data: Please correct "1750565" to read -- 1750565-2 --

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*